Oct. 3, 1939.  G. SOULAT  2,174,846
SAFETY DEVICE FOR AUTOMOBILE VEHICLES
Filed Dec. 8, 1936  3 Sheets-Sheet 1
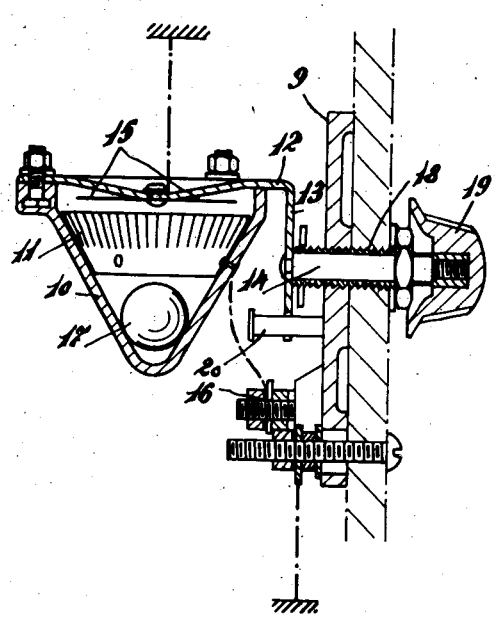
Fig. 1
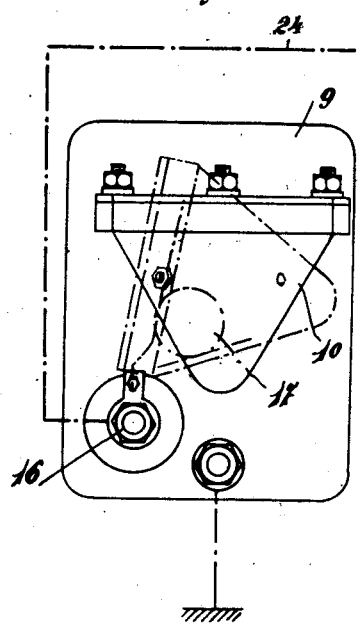
Fig. 3
Fig. 2
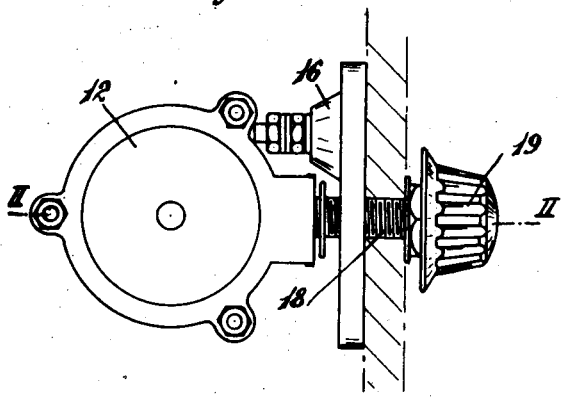
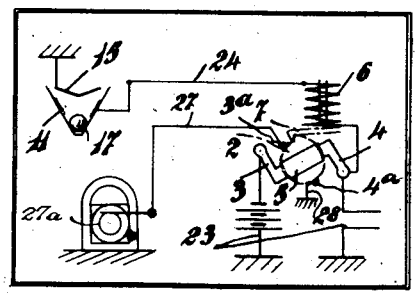
Fig. 6
Inventor:-
Georges Soulat
By Mason & Lewis
Attorneys

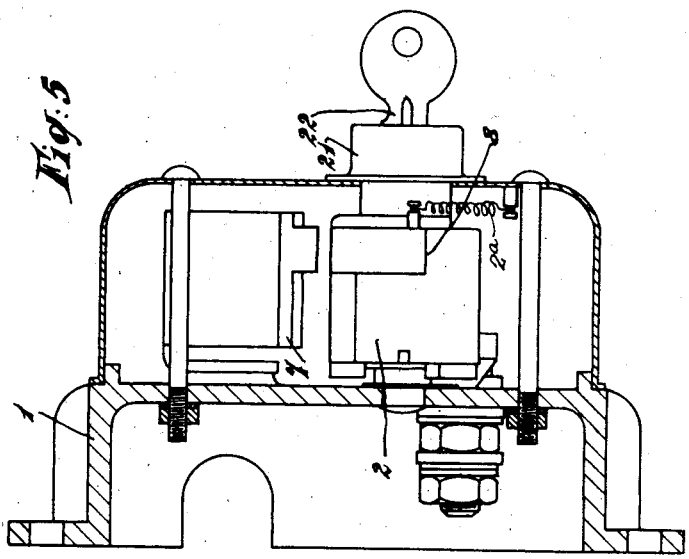
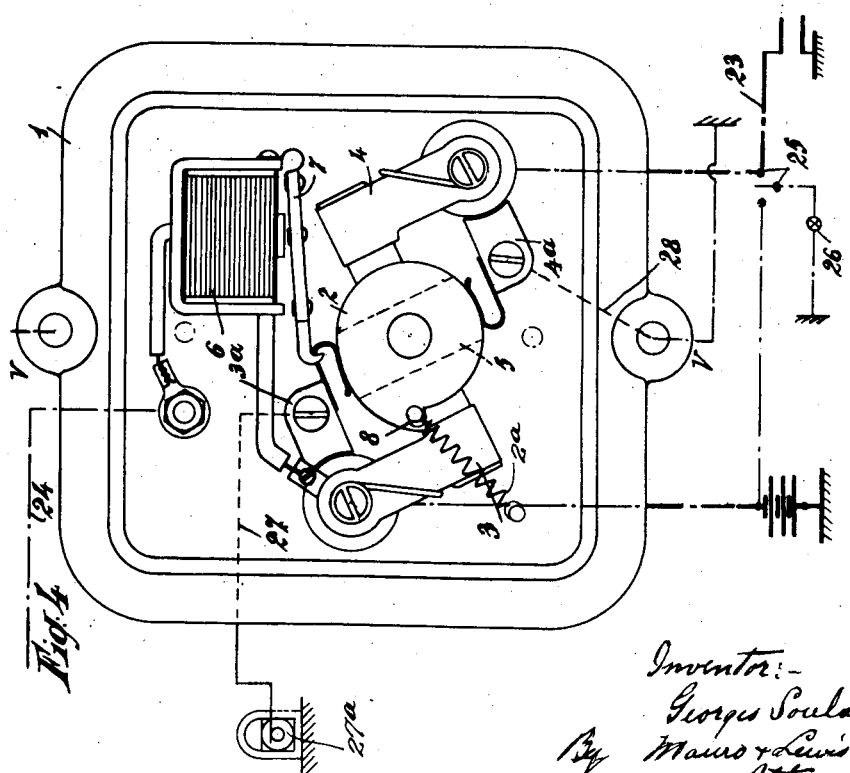

Oct. 3, 1939.   G. SOULAT   2,174,846
SAFETY DEVICE FOR AUTOMOBILE VEHICLES
Filed Dec. 8, 1936   3 Sheets-Sheet 3
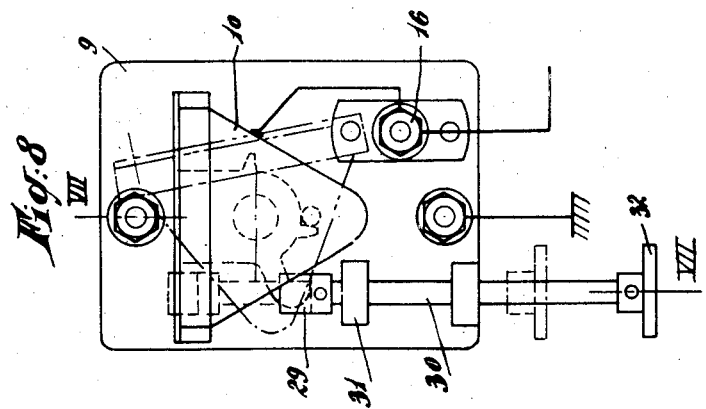
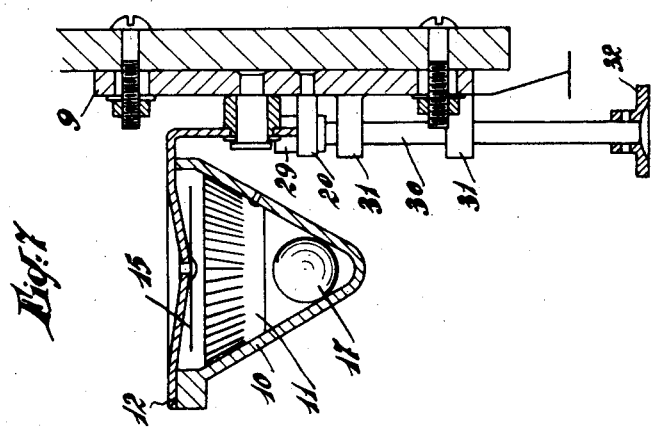
Inventor:-
George Soulat
By Mauro & Lewis
Attorneys Patented Oct. 3, 1939

2,174,846

UNITED STATES PATENT OFFICE 2,174,846

SAFETY DEVICE FOR AUTOMOBILE VEHICLES

Georges Soulat, La Guerche sur l'Aubois, France

Application December 8, 1936, Serial No. 114,822
In France December 20, 1935

1 Claim. (Cl. 180—82)

In my prior Patent No. 1,987,495, I described a safety device for automobile vehicles adapted to automatically cut off the main electric circuit, and, in the case of automobiles having a magneto ignition system, to connect with the metallic mass of the vehicle the primary of this magneto, in the case of the vehicle overturning or violently striking an obstacle.

This safety device essentially includes a contactor and a circuit-breaker proper controlled through at least one electro-magnetic relay. These organs, to wit, the contactor and the circuit-breaker, are mounted on the same support. The contactor includes a contact piece, such as a ball, movable by gravity in a funnel-shaped member having a lid, both of the two last mentioned parts being of an electricity conducting material but being normally insulated from each other, said funnel-shaped member and said lid being inserted in a shunt circuit normally open and connected to the main circuit. In this shunt circuit is inserted the relay of the circuit-breaker proper, which relay consists of an electro-magnet the movable armature of which is engaged with the movable part of the circuit-breaker through which the main circuit is kept normally closed, and, in the case of a magneto ignition system, the primary circuit of said magneto normally open. When the vehicle overturns or undergoes a very violent shock, the ball or equivalent movable organ is caused, under the action of gravity or inertia, electrically to connect the funnel-shaped member with its lid, thus closing the circuit of the electro-magnet. This operates the circuit-breaker in such manner as to break the main electric circuit and eventually to connect the primary of the magneto with the metallic mass of the vehicle frame.

The present invention relates to safety devices of this kind and its object is to provide such an apparatus capable, on the one hand, of working in a smoother and more reliable manner, and, on the other hand, of preventing stealing of the vehicle, when the latter is stopped, by means of the circuit-breaker.

According to an essential feature of the present invention, the movable organ of the main circuit-breaker the release of which by the electro-magnet opens the main electric circuit of the vehicle and eventually connects the primary of the magneto with the metallic mass of the chassis is manually brought back into its initial position by means of a removable operating piece, such for instance as a safety key.

This feature of the present invention permits, as it will result from the following explanations, of obtaining, through the combination of a manually operable contactor and of a safety key, a protection against theft of the vehicle when the latter is left alone.

Other features of the present invention will result from the following detailed description of some specific embodiments thereof.

Preferred embodiments of the present invention will be hereinafter described, with reference to the accompanying drawings, given merely by way of example, and in which:

Fig. 1 is a vertical sectional view of the contactor or gravity switch on the line II—II of Fig. 2;

Fig. 2 is a plan view of said contactor corresponding to Fig. 1;

Fig. 3 is an elevational front view of the device of Fig. 1;

Fig. 4 is an elevational view of the main circuit-breaker in the released position;

Fig. 5 is a corresponding side view partly in section on the line V—V of Fig. 4;

Fig. 6 is a diagram of the connections showing the circuit-breaker in the position in which it closes the main electric circuit;

Fig. 7 is a vertical sectional view on the line VII—VII of Fig. 8 of another embodiment of the gravity switch;

Fig. 8 is a front elevational view corresponding to Fig. 7.

In the embodiments of the invention shown by the drawings, the main circuit breaker is made in the same manner as in my prior patent above referred to and it is carried by a support 1 which may be fixed at any suitable point of the vehicle. This circuit breaker includes a cylinder 2 adapted to rotate about its own axis through an angle of 90° between brushes 3, 4, inserted in the main electric circuit 23 of the vehicle (in the drawings, this circuit is shown in strong or heavy dotted lines). These brushes are adapted to cooperate with the ends of a rod 5, made of an electricity conducting material, and which extends radially from one side of the cylinder to the opposite side thereof. The system also includes an electro-magnet 6 the movable armature 7 of which is adapted to engage a projection 8 carried by cylinder 2, so as to maintain said cylinder in the position in which it closes the main circuit. Elastic means, such as a spring, 2a, urges, on the contrary, said cylinder toward the position in which it breaks the main circuit (position shown by Fig. 4). The electro-magnet is inserted in a shunt circuit 24 connected to one of the brushes and shown in dotted lines. In the example shown by the drawings, I have further provided two brushes 3a and 4a bearing against cylinder 2 and disposed along a diameter at right angles to the diameter along which brushes 3 and 4 are positioned. These brushes 3a and 4a are intended to stop the working of the magneto when the circuit-breaker is released, since one of these two last mentioned brushes is connected through 27 with the magneto 27a while the other one is connected through 28 to the metallic mass of the vehicle, that is to say, for instance the chassis thereof. When the circuit breaker is released, these brushes 3a and 4a are connected together by the conducting rod 5 above referred to. Therefore the primary circuit of the magneto is earthed and the high voltage current to be produced in the secondary cannot be obtained, so that ignition is no longer produced by the spark plugs.

All the organs above described are enclosed in a fluid tight box carried by support 1.

The contactor is mounted on a plate 9, which can be fixed, for instance, to the instrument board of the vhicle. It includes a funnel-shaped member 10 made of an electricity insulating material, such as Bakelite, inwardly lined, along its intermediate part, with a metallic ring 11 in the form of a frustum of a cone. This member 10 is fixed to a plate 12, which constitutes both the lid and the support thereof. Said plate is integral with a right-angled extension 13 fixed to the end of a spindle 14 carried by support 9. The portion of plate 12 which forms the lid of funnel-shaped member 10 is slightly conical, with the apex of the cone turned downwardly. To this apex are fixed small metal blades 15 connected to the metallic mass of the vehicle. Metallic ring 11 is connected, through the funnel-shaped member, by means of a wire, to a terminal 16 fixed to supporting plate 9 and inserted in the shunt circuit including the electro-magnet 6 of the main circuit-breaker. A metallic ball 17, free to move in funnel-shaped member 10 remains, under normal conditions, at the bottom of said member 10. When said member is inclined, as shown in dotted lines in Fig. 3, said ball establishes the contact between ring 11 and the metallic blades above referred to so as to close the circuit of the electro-magnet.

Spindle 14 extends through plate 9 and the instrument board of the vehicle, owing to the provision of a sleeve 18 screwed in these two last mentioned parts and in which spindle 14 can turn with a certain friction. Spindle 14 carries, at the end thereof that faces the driver's seat, a milled knob 19. By acting on said knob it is possible to incline the funnel-shaped member, the amplitude of this movement being limited by a stop 20 adapted to cooperate with part 13. A spring, not shown in the drawings, is adapted to bring the funnel-shaped member into its initial position as soon as the knob is released.

The junction of the wire connecting ring 11 to terminal 16 is located on the axis of sleeve 18, whereby the connecting wire is not given an angular displacement when funnel-shaped member 10 is rotated.

The cylinder 2 of the main circuit breaker includes a part 21 which projects from the protecting box in which it is enclosed, said part being provided with a hole into which can be introduced a piece 22 of corresponding shape permitting to rotate cylinder 2 so as to bring it back into engagement with the armature of the electro-magnet. This removable piece and the corresponding hole are preferably devised as in a safety lock in such manner that the circuit-breaker can be restored into its initial position only by means of its special key.

The electrical connections between the parts are clearly visible in Fig. 6.

From what precedes it is obvious that the device above described can act both as an automatic circuit-breaker and as a manually operated circuit-breaker.

When the vehicle is running, under normal conditions, the shunt circuit in which the electro-magnet is inserted is open, since the ball is not interposed between the corresponding contacts, and the main circuit is closed, the armature of the electromagnet keeping cylinder 2 in the position in which rod 5 connects brushes 3 and 4 together (Fig. 6).

If the vehicle overturns in an accident, the funnel-shaped member of the contactor naturally comes into an inclined position and the ball closes the circuit of the electro-magnet. The electro-magnet is therefore energized, releasing cylinder 2, which, under the action of its string (not shown) cuts off the main current and connects the primary circuit of the magneto with the metallic mass of the apparatus (chassis of the car) if the device is provided with means for this purpose (for instance as shown by Fig. 4). As a consequence, the engine stops, which reduces the risks of fire. If, instead of overturning, the vehicle violently strikes an obstacle, the ball, under the effect of its inertia, climbs along the wall of the funnel shaped member and establishes a contact between ring 11 and the metallic blades of the lid, producing the same result as above described.

It should be noted that, when the vehicle is normally stopped, it is possible, by means of operating knob 19, which is within reach on the instrument board, to rotate the funnel-shaped member so as to bring it into the position for which the ball closes the circuit of the electro-magnet (as shown in dotted lines in Fig. 3). This gives two results: On the one hand, it is possible, by operating in this way, to check the good working of the device, since the main current must be cut off when knob 19 is turned. On the other hand, by removing key 22 after having turned knob 19, theft of the vehicle is rendered impossible because the main circuit is opened and can be closed back only by means of the special safety key. As a matter of fact, it little matters whether the contactor is left or not in the position in which it breaks the circuit since the armature of the electro-magnet has released the cylinder of the main circuit-breaker.

It will be readily understood that detail modifications may be made in the embodiment above described without departing from the principle of the present invention.

For instance the contactor and the main circuit breaker may be given the specific structure disclosed in my prior patent above referred to, or any other special structure.

The circuit breaker, instead of being of the rotary type, might be of the "knife" or "sliding contact" type or of any other kind. The rotation of the funnel-shaped member might be produced by a push-piece, a rod, an oscillating lever, or any other suitable means.

By way of example, another embodiment of the contactor is shown in Fig. 7, which is a vertical sectional view in the same plane as that of Fig. 1, and in Fig. 8, which is a front elevation corresponding to Fig. 7. The pivoting support of the funnel-shaped member includes a lateral arm 29 the rotary movement of which about the pivoting axis is controlled by a rod 30 sliding in bosses 31 of the supporting plate and provided with a knob 32 at its lower end. The apparatus is operated by imparting to the knob a vertical upward movement which, through the arm 29 above referred to, causes the funnel-shaped member to pivot so that ball 17 establishes an electrical connection between the funnel shaped member and its lid. A spring, not shown in the drawing, brings back the funnel-shaped member into its initial position as soon as the knob is no longer acted upon.

I may provide a switch 25 (Fig. 4) intended temporarily to place the signal lights 26 out of the main circuit, which would permit of keeping them switched on when the vehicle is stopped and the main circuit-breaker has been released.

I might also provide, according to the present invention, a locking device maintaining the funnel-shaped member in the inclined position (shown in dotted lines in Fig. 3), which would make it impossible to reengage the main circuit breaker with the armature of the electro-magnet and would therefore constitute a supplementary safety feature against theft of the auomobile.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claim.

What I claim is:

In an automobile vehicle including an electric circuit and a source of current in said circuit, a safety device for breaking said circuit in case of the vehicle overturning or striking an obstacle, which comprises, in combination, a control switch in said circuit elastically urged toward the circuit breaking position thereof, movable locking means for keeping said switch in the circuit closing position thereof, relay means adapted, when energized, to bring said locking means out of action, a permanently closed casing surrounding all of the parts of the combination above mentioned, a key adapted to be engaged into said casing from the outside for bringing said control switch into circuit closing position, a normally open auxiliary circuit for said relay means, gravity and inertia responsive switch means in said auxiliary circuit for automatically closing it when said vehicle overturns or strikes an obstacle, said switch being located on the outside of said casing, and manually operative means for bringing said switch means into circuit opening position.

GEORGES SOULAT.